United States Patent [19]
Altman et al.

[11] Patent Number: 5,297,176
[45] Date of Patent: Mar. 22, 1994

[54] REMOTELY REPLACEABLE FUEL ASSEMBLY ALIGNMENT PIN

[75] Inventors: David A. Altman, Plum; James R. Chrise, Trafford; Bruce W. Bevilacqua, Export; Gregory L. Calhoun, Allegheny Township, Westmoreland County, both of Pa.

[73] Assignee: Westinghouse Electric Corp., Pittsburgh, Pa.

[21] Appl. No.: 887,264

[22] Filed: May 22, 1992

[51] Int. Cl.$^5$ ................................................ G21C 5/06
[52] U.S. Cl. .......................................... 376/364; 411/55
[58] Field of Search ..................... 376/364, 446, 260; 411/44, 55, 56, 57; 403/277, 290

[56] References Cited

U.S. PATENT DOCUMENTS

| | | | |
|---|---|---|---|
| 4,820,479 | 4/1989 | Hornak et al. | 376/364 |
| 5,030,413 | 7/1991 | Knierriem et al. | 376/364 |
| 5,164,154 | 11/1992 | Brown et al. | 376/364 |

OTHER PUBLICATIONS

"Replacing fuel alignment pins in Germany"-Nuclear Engineering International, pp. 49-51 Sep. 1991.

*Primary Examiner*—Daniel D. Wasil
*Attorney, Agent, or Firm*—P. C. Watkins

[57] ABSTRACT

The guide pin aligning a top nozzle of a nuclear fuel assembly to an upper core plate of a nuclear reactor, is replaced working exclusively from below the upper core plate. The replacement guide pin has a shaft portion engaged with the upper core plate and the clamping nut which held the original guide pin, by threadable connection and/or by an expansion fitting. A shoulder on the pin bears against a lower surface of the upper core plate, and a nose of the pin is received in the top nozzle of the fuel assembly. A preferred expansion fitting has a bushing with ridges on its outer surface and a conical inside surface, and is inserted into the bored out original guide pin shaft. A threaded conical plug is pulled axially with rotation of the replacement pin shaft to expand the bushing. The ridges rigidly lock the replacement pin between the shoulder and the clamping nut. By attaching the replacement pin to the stub of the original pin, the invention utilizes existing attachments of the original pin to the upper core plate.

12 Claims, 3 Drawing Sheets

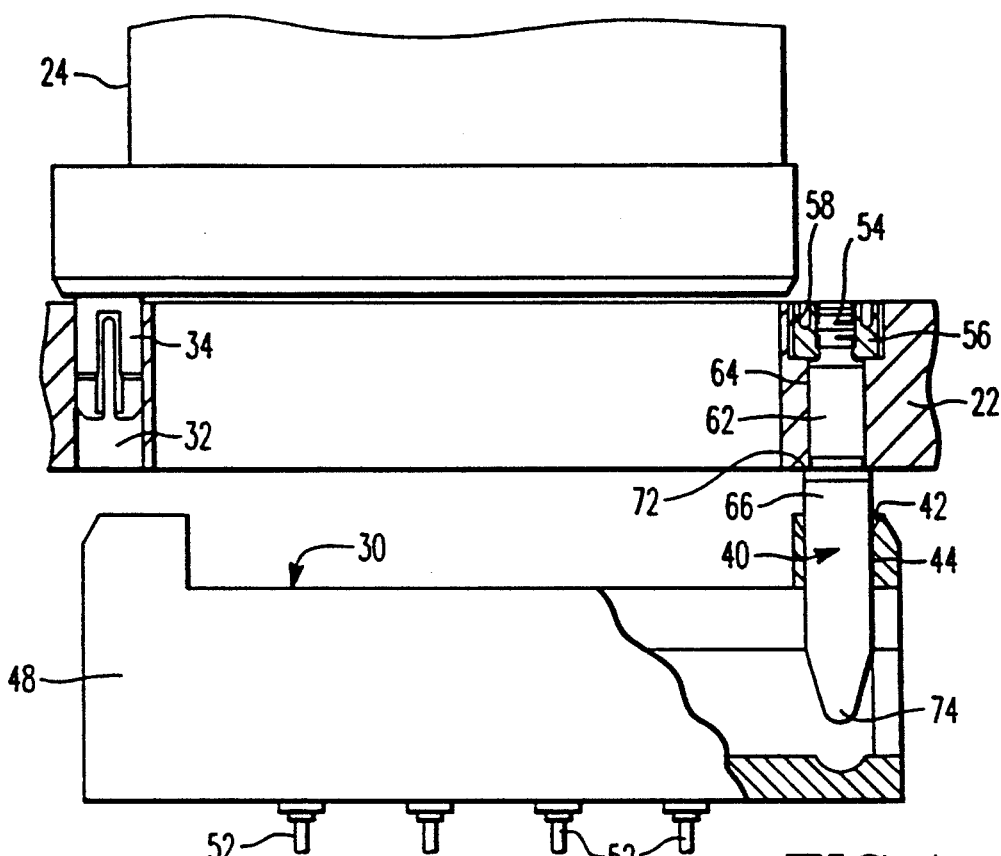
FIG. 1
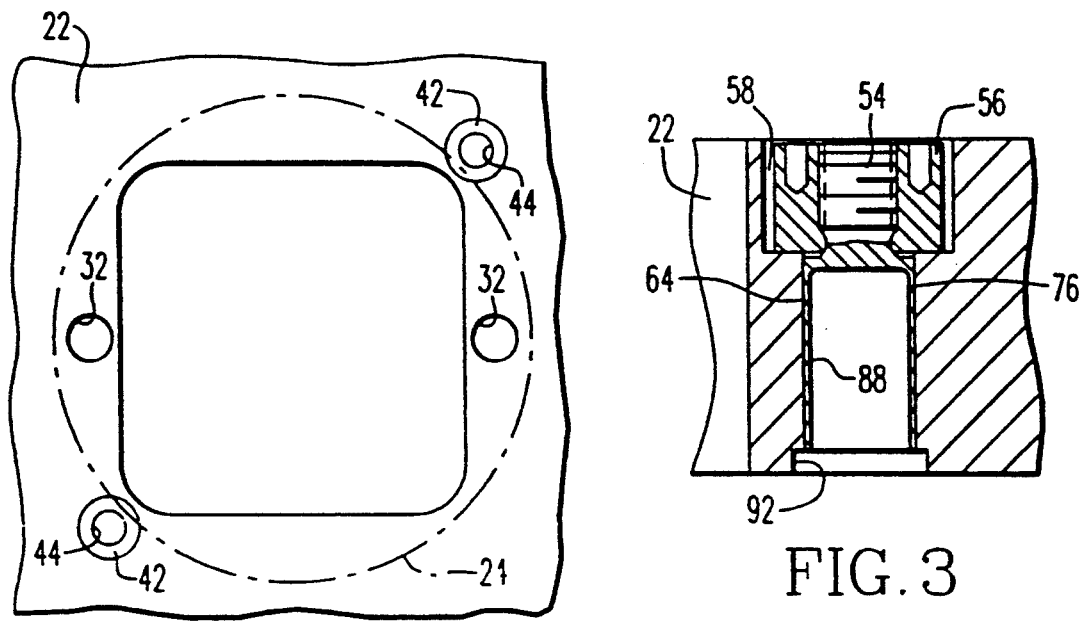
FIG. 2
FIG. 3

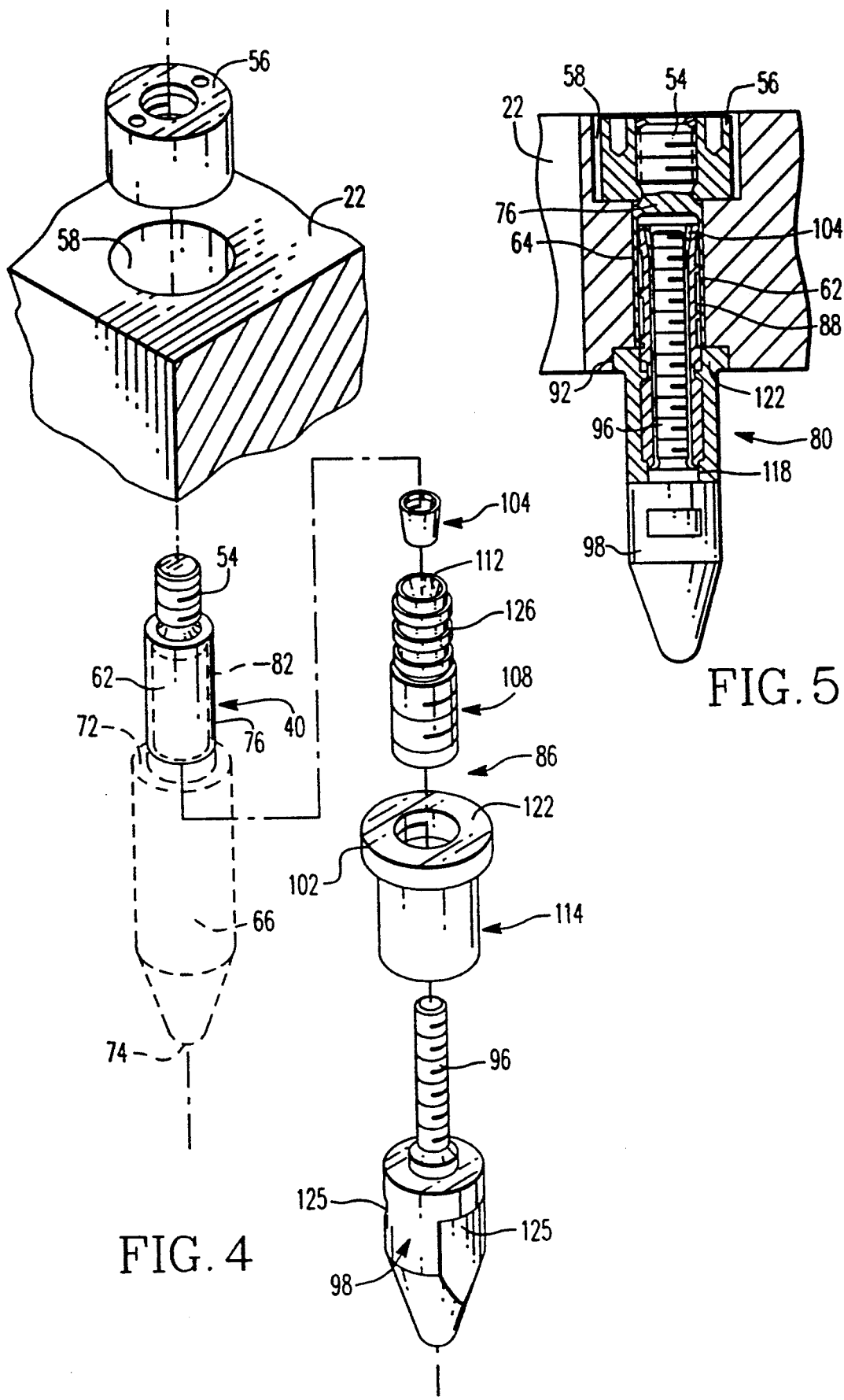

REMOTELY REPLACEABLE FUEL ASSEMBLY ALIGNMENT PIN

BACKGROUND OF THE INVENTION

This invention relates to replacement fuel assembly alignment pins for installation in the upper core plate of a nuclear reactor, working exclusively from the bottom side of the upper core plate. The invention provides a replacement pin structure and method for mounting the replacement pin from below the core plate, which captures the remnants of the existing fuel alignment pin and nut, thus eliminating the risk of internal damage as well as the cost associated with accessing the top of the upper core plate when replacing alignment pins.

Pressurized water nuclear reactors have fuel assemblies supported in the reactor core between upper and lower core plates. The lower core plate is supported by a core barrel, which surrounds the reactor core between the upper and lower core plates. A number of fuel assemblies reside between the upper and lower core plates. Each fuel assembly has an upper end structure known as the top nozzle, and a lower end structure or bottom nozzle. The upper nozzle comprises an upper hold-down plate and a lower adapter plate, rigidly coupled by sidewalls forming a top enclosure on the fuel assembly. The upper and lower nozzles are arranged parallel to one another and parallel to intermediate grid plates, the grid plates having openings through which a plurality of spaced parallel fuel rods extend between the nozzles. Extending between the nozzles and through the grid plates, and perpendicular thereto, are guide tubes or thimbles which support movable control rods. The nozzles, thimbles and grid plates form an integral fuel assembly unit for carrying, for example, about three hundred fuel rods as a unitary structure, and a plurality of such assemblies are placed in close proximity between the upper and lower core plates of the reactor core.

The control rods are moved axially into the fuel assembly to damp the nuclear flux, and out of the fuel assembly to increase nuclear flux, namely by either absorbing or allowing passage of the products of nuclear fission passing between the fuel rods. In this manner, it is possible to control the generation of heat in the reactor core, which is submerged in a heat transfer fluid, i.e., pressurized water.

The control rods are controllably lowered vertically through the upper core plate into thimbles of the fuel assemblies. Therefore, it is important that the fuel assemblies be accurately aligned relative to the core plates in order to allow accurate and free passage of the control rods in the fuel assembly thimbles. The control rods are mounted relative to the bottom flange of a guide structure which includes a guide tube support pin engaging in the upper surface of the core plate and thus referencing the control rods to the core plate. For likewise referencing the fuel assembly to the core plate, the core plate has protruding alignment pins oriented parallel to the axes of the fuel rods, control rods and thimbles. The alignment pins attached to the core plates mate with openings in the nozzles of the fuel assemblies, thereby fixing the relative positions of the fuel assembly thimbles and the control rods.

The fuel assemblies must be serviced periodically, for example for replacement of the fuel rods, and can be removed from engagement with the core plates for this purpose, and thereafter replaced. The alignment pins are sometimes damaged in such operations. The failure of particular alignment pins can adversely affect the ability to control the reactor core, due to resulting misalignment of the control rods and the thimbles for receiving them. Therefore, the alignment pins are routinely checked, and sometimes replaced.

The attachment of the alignment pins to the core plate is also necessarily durable and rigid, to keep the alignment pins accurately fixed in position as well as to minimize damage. In U.S. Pat. No. 4,820,479—Hornak et al, an alignment pin is disclosed with a conical nose for engaging a fuel assembly, a shoulder resting against the lower surface of the upper core plate, and a shaft protruding through the upper core plate. The shaft of the alignment pin is threaded to receive a nut, for clamping the alignment pin to the upper core plate between the shoulder and the nut. The shaft also has a transverse opening which resides above the clamping nut when tightened down. A deformable locking cup is placed on the shaft of the alignment pin over the clamping nut, engaged to the clamping nut preferably by welding, and crimped to engage in the transverse opening in the shaft of the alignment pin. The locking cup thus cannot turn relative to the shaft and likewise prevents rotation of the clamping nut.

It is also known in such an arrangement to weld the clamping nut directly to the top surface of the upper core plate and thereby prevent the clamping nut from loosening. The Hornak alignment pin mounting is considered advantageous because it is more readily replaceable. To remove an alignment pin, the deformable locking cup is forced out of engagement with the transverse opening in the shaft of the pin, and the clamping nut can be loosened. However, this requires access to the top surface of the upper core plate to loosen and remove the clamping nut, and access to the bottom surface of the upper core plate to hold and/or retrieve the alignment pin.

Other forms of clamping nuts on the top surface of the upper core plate are also known. The clamping nut can be disposed in a counterbore in the upper core plate, fixed to the core plate by various forms of locking pins, screws or keys, etc. A more permanent and secure coupling of the clamping nut to the upper core plate is desirable to obtain a durable mounting for the alignment pin. A more durable mounting is of course more difficult to remove than a less durable one, and in either case, removing the mounting requires access to the top of the upper core plate.

Alignment pins are replaced using a remotely controlled and/or at least partly robotic techniques, monitored by video, to avoid exposure of plant personnel to the radioactive core elements. A certain amount of space is needed to accommodate the tools and viewers needed to conduct pin replacement operations. Typically, part of the upper internals of the reactor, in the region over the upper core plate, must be removed to gain access to the clamping nuts of the alignment pins. Removal of such structures, operations in this region, and replacement of the structures, are time consuming and may cause damage to the structures in the region. For all these reasons, it is desirable to enable a pin replacement technique which is conducted entirely from below the upper core plate.

SUMMARY OF THE INVENTION

It is an object of the invention to provide an alignment pin replacement structure which is secure and relatively permanent, and which can be installed working exclusively from the underside of the upper core plate.

It is another object of the invention to provide a replacement alignment pin design which captures an existing fuel alignment pin clamping nut structure for obtaining a secure engagement with the core plate.

These and other objects of the invention are accomplished by a replacing the guide pin aligning a top nozzle of a nuclear fuel assembly to an upper core plate of a nuclear reactor, with the replacement guide pin of the invention, working exclusively from below the upper core plate. The replacement guide pin has a shaft portion engaged with the upper core plate and the clamping nut which held the original guide pin, by threadable connection and/or by an expansion fitting. A shoulder on the pin bears against a lower surface of the upper core plate, and a nose of the pin is received in the upper nozzle of the fuel assembly. A preferred expansion fitting has a bushing with ridges on its outer surface and a conical inside surface, and is inserted into the bored out original guide pin shaft. A threaded conical plug is pulled axially with rotation of the replacement pin to expand the bushing. The ridges form a series of axially spaced concentric rings and grooves, that rigidly lock the replacement pin between the shoulder and the clamping nut.

BRIEF DESCRIPTION OF THE DRAWINGS

There are shown in the drawings exemplary embodiments of the invention as presently preferred. It should be understood that the invention is not limited to the precise arrangements and instrumentalities shown and discussed, and is capable of variation in accordance with the scope of the appended claims and their reasonable equivalents. In the drawings, FIG. 1 is an elevation view, partly in section, showing a control rod guide tube, upper core plate and fuel assembly, in aligned operative relationship;

FIG. 2 is a top plan view of a core plate, showing an exemplary arrangement of alignment pins;

FIG. 3 is partial section view corresponding to FIG. 1, showing the alignment pin and upper core plate having been bored and counterbored, respectively, for receiving the replacement alignment pin of the invention;

FIG. 4 is an exploded perspective view showing the alteration of the original alignment pin and installation of a preferred embodiment of the replacement alignment pin of the invention;

FIG. 5 is a partial section view showing the assembled replacement pin; and,

DETAILED DESCRIPTION OF THE PREFERRED EMBODIMENTS

Figure 6:
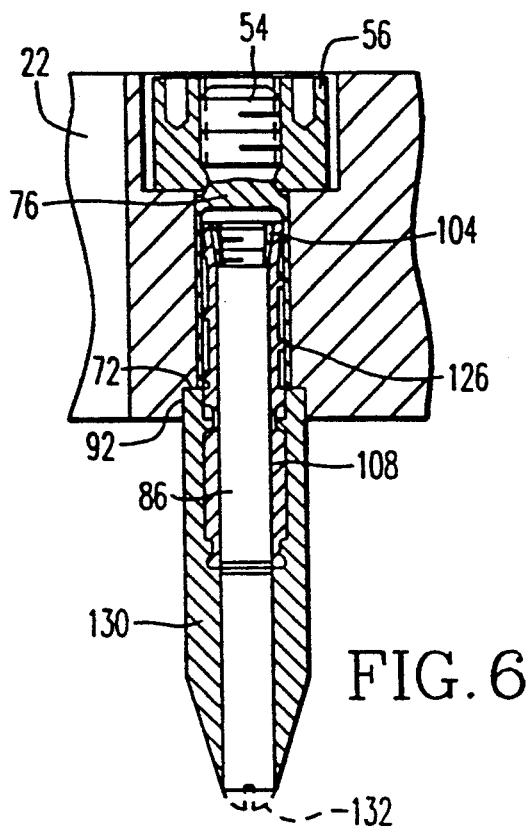
FIGS. 6, 7 and 8 are partial section views showing alternative embodiments of the replacement pin of the invention.

In FIG. 1, the upper core plate 22 of the nuclear reactor, for example a pressurized water reactor, includes means for referencing the position of the control rod guide tube 24, an upper internal structure of the reactor, and the fuel assembly 30, disposed below the upper core plate 22. The control rod guide tube 24 is referenced to the core plate, for example, by a guide hole 32 in the core plate 22 receiving a guide tube support pin 34 attached to the control rod guide tube 24. The fuel assembly 30 is referenced to the upper core plate 22, and therefore to the control rod guide tube 24, by fuel assembly alignment pins 40, which protrude below the core plate 22 to engage in tapered openings 42 leading to cylindrical bores 44 in the top nozzle structure 48 of the fuel assembly 30. The top nozzle 48 is centrally open to allow passage of the control rods into thimbles 52 which are interspersed among a plurality of fuel rods (not shown).

A plurality of fuel assemblies 30 are disposed under the upper core plate 22, only one being shown in the drawings. The top nozzle 48 of each fuel assembly forms an enclosure allowing the control rods to pass from the guide tube 24, through an opening in the core plate 22, into the thimbles 52 for the control rods. The thimbles 52 extend to the bottom nozzle, such that the fuel assemblies 30 each form a unitary structure upon which a number of fuel rods can be moved about as a unit for servicing. FIG. 2 shows the relative positions on the upper core plate 22 of the receptacles 42, 44 for the fuel assembly alignment pins 40, the guide holes 32 for the control rod guide tube support pins 34, and the opening in the upper core plate allowing passage of the control rods.

Referring again to FIG. 1, the fuel assembly alignment pin 40 is mounted rigidly to the upper core plate 22 via a threaded upper end 54, received in a clamping nut 56 disposed in a counterbore 58 in the top of the upper core plate 22. The alignment pin 40 has an upper cylindrical section 62 which fits closely in a throughbore 64 in the upper core plate 22, and a protruding lower section including a cylindrical proximal portion 66 which fits closely in a mating opening 44 in the top nozzle 48. This proximal portion 66 has a greater diameter than the throughbore 64, thereby defining a shoulder 72 which bears against the bottom surface of the upper core plate 22 when the alignment pin 40 and the clamping nut 56 are threaded together. The distal end of the alignment pin is tapered to a spherical point 74, and the opening 42 in the top nozzle 48 of the fuel assembly 30 is tapered in a complementary manner, whereby the fuel assembly 30 is guided into precise position by the alignment pin 40 as the upper plate 22 is lowered axially over the fuel assembly. Two alignment pins are provided for each fuel assembly. After being mechanically engaged tightly with the upper core plate 22 by pressure exerted between the shoulder 72 and the clamping nut 56, the alignment pin 40 is locked in position, typically by welding. For example, the threaded end 54 of the alignment pin 40 can be welded to the clamping nut, and the clamping nut can be fixed to the core plate. Other particular means for fixing the clamping nut, core plate and pin are also possible, resulting in the alignment pin 40 being fixed rigidly relative to the core plate 22.

The alignment pins can become damaged, for example being bent by inaccurate manipulation of the core plate 22, resulting in the fuel assembly alignment pins 40 impacting objects rather than mating with their receptacles 44. According to the invention the alignment pins 40 can be replaced from the underside of the upper core plate 22, first removing the upper internals from the reactor vessel for access to the alignment pin, removing a portion 82 of the original alignment pin, and engaging the remaining stub portion 76 with a replacement pin 80.

As shown in FIG. 3, the upper alignment pin mounting structure including the threaded end 54 and the clamping nut 56 are not disturbed. The lower cylindrical portion 62 and tapered nose of the original alignment pin 40 are cut away. The shank portion of the alignment pin is bored along its centerline, preferably to less than its full diameter, thereby leaving in place a tube along the shank, residing against the walls of the throughbore 64 in core plate 22. Preferably, a counterbore 92 on the underside of the core plate 22 is formed as well, also along the centerline of the original alignment pin 40.

FIG. 4 illustrates in broken lines the material 82 of the original alignment pin which is removed, namely the inside of the upper cylindrical portion, the entire lower cylindrical portion and the tapered nose. The remainder 76 of the original alignment pin 40 remains fixed to the upper core plate 22 (although for purposes of illustration the pin stub 76 and clamping nut 56 are shown separated from the core plate 22 and from one another in FIG. 4). A four part expansion fitting 86 is mounted in the bore 88 formed in the remainder 76 of the original alignment pin (or the stub), and in the counterbore 92 on the bottom side of the upper core plate 22.

The replacement pin 80 includes a threaded shank 96 with a guide portion 98 at the lower end, corresponding to the nose of the original pin 40 and part of the larger diameter cylindrical section 62. A conical threaded plug 104 is threaded on the shank 96, over an expansion bushing 108 having a conical internal section 112 complementary to the conical threaded plug 104. Rotation of the nose or guide portion 98, and more particularly the shank 96, draws the conical plug 104 into the expansion bushing 108. This forces the expansion bushing to enlarge in diameter, engaging the replacement guide pin 80 with the shaft of the original guide pin 40.

According to FIG. 4, an outer flanged bushing 114 is provided between the guide portion 98, which can be integral with the threaded shaft 96, and the expansion bushing 108. The tapered plug 104 is arranged to expand the top portion of the expansion bushing 108. The bottom portion of the expansion bushing extends into an axial opening in the flanged bushing 114 which extends nearly to the lower end of the flanged bushing, leaving a radially inward flange 118 for bearing against the guide portion. The radial outward flange 122 at the top of the flanged bushing resides in the counterbore 92 in the bottom surface of the upper core plate 22. Referring to FIG. 5, by rotating the nose or guide portion 98 and the threaded shank 96, the conical plug 104 is pulled axially downward to enlarge and engage the expansion bushing with the stub 76 of the original alignment pin 40. At the same time, the nose or guide portion 98 is pulled upwardly, to compress the flanged bushing 114 axially between the guide portion 98 and the upper core plate 22. Provided the assembly is positioned well upwardly before tightening the shank 96 in the conical plug 104, the alignment pin 80 is securely and permanently fixed in the upper core plate 22, benefitting from the original mounting of the original alignment pin stub 76 with the clamping nut 56 and the upper core plate 22.

The guide portion or nose 98 preferably is structured to receive a wrench or similar tightening tool, e.g., being faceted as shown in FIGS. 4 and 5. In the embodiment shown, flat sides 124 are formed in the guide portion 98, to engage with an open end wrench or the like. The flat sides can be extended into the tapered nose to provide flats 125 that allow engagement by a socket wrench. It would also be possible to provide a nut-shaped end structure or a non-round female socket on the guide portion 98, to provide radial openings for receiving opposed engagement pins, or otherwise to arrange the guide portion or nose 98 for application of torque to the threaded shaft 96.

The expandable bushing 108 is made from a material which is at least somewhat deformable, as needed for expansion. This requirement may be inconsistent with the need for a durable structure to contact the top nozzle 48 of the fuel assembly 30. In the embodiment according to FIG. 5, the flanged bushing 114 can be made of a relatively harder material than the expandable bushing 108.

The expandable bushing 108 preferably is provided with a ridge structure 126 on its outer surface, for bearing against the bore 88 in the original guide pin stub 76 for securely engaging the replacement guide pin 80 relative to the upper core plate 22. With expansion of the bushing 108, the ridge structure 126 engages against the bore 88 to provide a lock against axial displacement of the replacement pin assembly 80. The ridge structure 126 preferably defines a series of axially spaced ridges and grooves which when locked into stub 76 fix the assembly of the guide portion 98, the plug 104 and the expansion bushing 108 in place on the upper core plate 22. Torque applied to the threaded shank via the guide portion 98 tends to draw the plug 104 into the expansion bushing 108, to lock the assembly axially and to draw the assembly upwardly against the core plate 22. The shoulder 122 defined by the flanged bushing 114, which was placed initially against the lower surface of the upper core plate 22, is urged tightly against the bottom surface of the core plate 22 as the expansion bushing 108 engages in the stub 76 of the original alignment pin 40.

Figure 7:
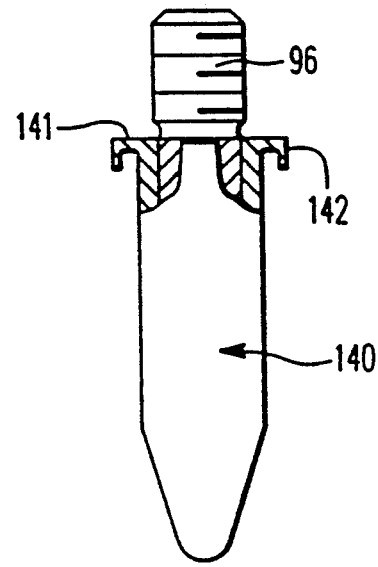
Figure 8:
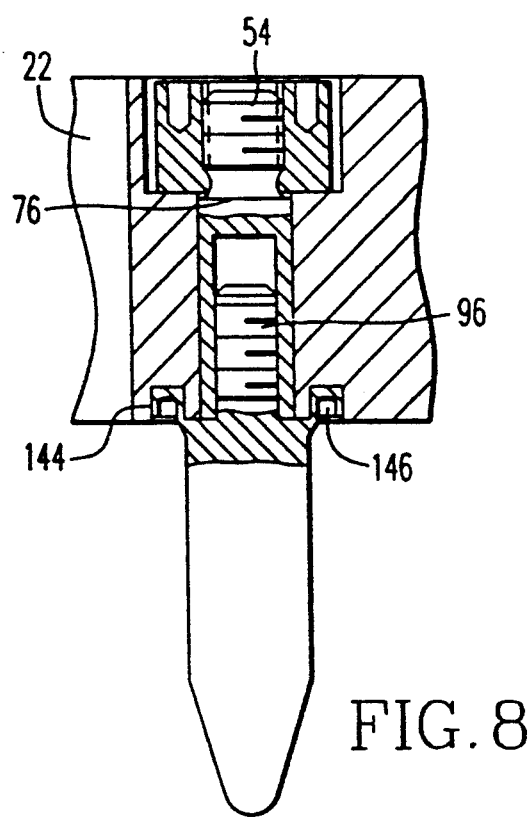

Whereas the replacement pin assembly according to the invention engages in a portion of the original alignment pin 40, the original attachment means, such as the clamping nut 56 and any welding on the top of the core plate 72, are employed in the structural support of the replacement pin assembly. Furthermore, the replacement operation is conducted exclusively from below the core plate 22 because these upper structures are not disturbed. FIGS. 6-8 illustrate some alternative replacement pin structures whereby these objectives can also be achieved, with the same reference numerals used in the respective figures to identify corresponding structures.

In FIG. 6, a full length guide portion or nose 130 of the replacement pin extends to the counterbore 92 in the bottom of the core plate 22 rather than to a flanged bushing between the guide portion and the core plate as in FIG. 5. Additionally, the guide portion 130 is axially bored to receive a bolt 32 (shown in dashed lines) which engages the conical plug 104 for the expansion bushing 108. This structure operates in substantially the same manner as the embodiment of FIG. 5, but is somewhat less resistant to transverse forces due to its relatively smaller diameter at the shoulder 72 engaging in the counterbore 92.

In the alternative according to FIG. 7 the guide portion or nose 140 is threaded at its top, to engage in a corresponding thread in the stub 76 of the original guide pin 40 or in a thread formed in the bore 64 of the core plate 22, preferably extending into the clamping nut 56. This requires that the stub 76 or the bore 64 be tapped for receipt of the replacement pin 140. The flange 142 forming the shoulder 141 for engagement in the counterbore 92 according to this embodiment is arranged with an annular channel. The flange 142 can be integral with the guide portion 140 of the replacement pin, or can be a separate part which is attached to the guide portion.

In FIG. 8, the replacement pin is also threaded into the stub 76 of the original pin 40. This embodiment illustrates that the bore 88 in the stub can be such as to leave a substantial thickness in the walls of the stub at the bore. In FIG. 8, the flange 144 extends axially over the lowermost end of the stub 76 and resides in an annular groove 146 in the underside of the core plate 22 surrounding the stub 76. This embodiment supports the replacement pin on a relatively larger diameter base than a similar arrangement in which the flange is immediately adjacent the stub.

The invention having been disclosed, a number of further variations will become apparent to persons skilled in the art. The invention is intended to encompass a reasonable range of variations which are equivalent to the exemplary arrangements discussed in detail. Accordingly, reference should be made to the appended claims rather than the exemplary embodiments in order to assess the scope of the invention in which exclusive rights are claimed.

We claim:

1. A guide structure for aligning a top nozzle of a nuclear fuel assembly to an upper core plate of a nuclear reactor, the guide structure including a replacement for an original guide pin structure having an original guide pin rigidly mounted at a through bore in the upper core plate via a clamping nut rigidly attached to an upper surface of the upper core plate, said guide structure comprising:
    a shaft portion including an expansion fitting for rigidly engaging a bore extending through a portion of the original guide pin;
    wherein the shaft portion is attachable to said portion of the original guide pin exclusively from below the upper core plate;
    a guide portion affixed to the shaft portion, the guide portion having an upward facing shoulder for bearing against a lower surface of the upper core plate, and a nose dimensioned for receipt in the upper nozzle of the fuel assembly.

2. The guide structure according to claim 1, wherein said expansion fitting being enlargeable to lock the replacement guide pin to said portion of the original guide pin.

3. The guide structure according to claim 2, wherein the guide portion includes a threaded shank, a conical threaded plug threaded on the shank, and an expansion bushing having a conical internal section complementary to the conical threaded plug, whereby rotation of the guide portion draws the plug into the bushing for engaging the replacement guide pin with the shaft of the original guide pin.

4. The guide structure according to claim 3, further comprising a ridge structure on an outer surface of the expansion bushing, the ridge structure bearing against the bore in the original guide pin for securely engaging the replacement guide pin relative to the upper core plate.

5. The guide structure according to claim 4, wherein the ridge structure defines a series of axially spaced rings and grooves for axially fixing an assembly of the guide portion, the plug and the expansion bushing relative to the upper core plate.

6. The guide structure according to claim 5, wherein rotation of the threaded shank with the shoulder of the guide pin disposed against the lower surface of the upper core plate tends to expand the plug in the expansion bushing.

7. The guide structure according to claim 6, wherein the shoulder is defined by a flanged sleeve fitted over the threaded shaft between a nose of the guide pin and the upper core plate.

8. The guide structure according to claim 7, wherein the flanged sleeve is made of a more wear resistant material than the expansion bushing.

9. The guide structure according to claim 7, wherein the nose of the guide pin is faceted for receiving at least one of a wrench and a socket.

10. A replacement guide pin for aligning a top nozzle of a nuclear fuel assembly to an upper core plate of a nuclear reactor, the replacement guide pin apparatus being arranged as a replacement for an original guide pin structure including an original guide pin rigidly mounted at a through bore in the upper core plate via a clamping nut rigidly attached to an upper surface of the upper core plate, said replacement guide pin comprising:
    a shaft portion including an expansion fitting for rigidly engaging at least one of a portion of the original guide pin; p1 a guide portion affixed to the shaft portion, the guide portion having an upward facing shoulder for bearing against a lower surface of the upper core plate, and a nose dimensioned for receipt in the upper nozzle of the fuel assembly;
    wherein the shaft portion is attachable to said at least one of the portion of the original guide pin exclusively from below the upper core plate; and
    wherein the expansion fitting is dimensioned to fit a bore in a shaft of the original guide pin, the expansion fitting bearing outwardly to engage within the shaft of the original guide pin.

11. The replacement guide pin according to claim 10, wherein the guide portion includes a threaded shank, a conical threaded plug threaded on the shank, and an expansion bushing having a conical internal section complementary to the conical threaded plug, whereby rotation of the guide portion draws the plug into the bushing for engaging the replacement guide pin with the shaft of the original guide pin.

12. The replacement guide pin according to claim 11, further comprising a ridge structure on an outer surface of the expansion bushing, the ridge structure fixing an assembly of the guide portion, the plug and the expansion bushing relative to the upper core plate.

* * * * *